Nov. 18, 1941.    W. B. HEINZ    2,263,335
GAS ANALYZER
Filed Nov. 10, 1939    3 Sheets-Sheet 1

Inventor
WINFIELD B. HEINZ,
By Sidney A. Johnson
Attorney

Nov. 18, 1941. W. B. HEINZ 2,263,335
GAS ANALYZER
Filed Nov. 10, 1939 3 Sheets-Sheet 2
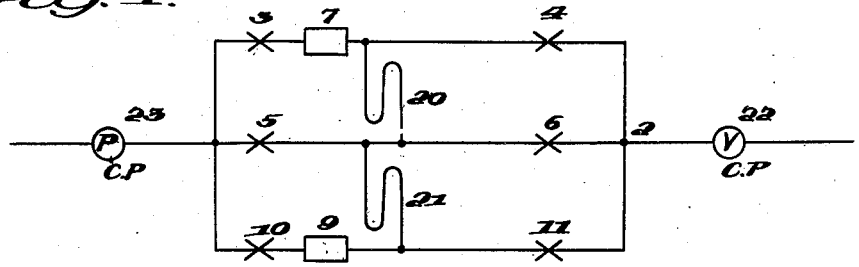
Fig. 4.
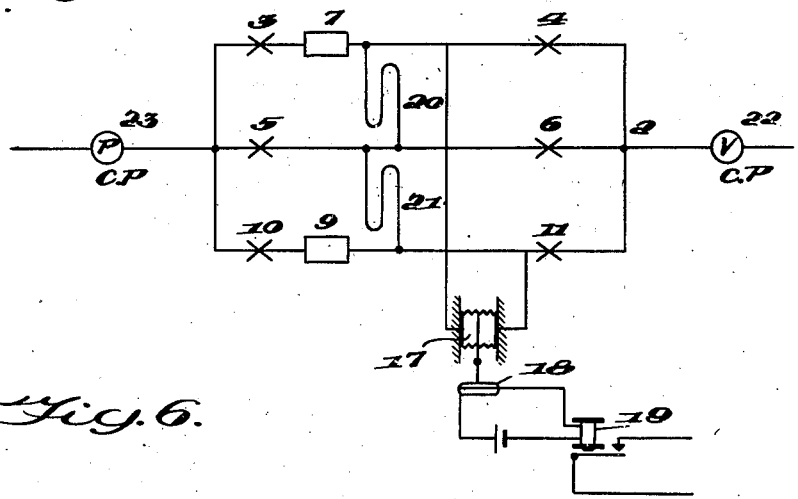
Fig. 5.
Fig. 6.
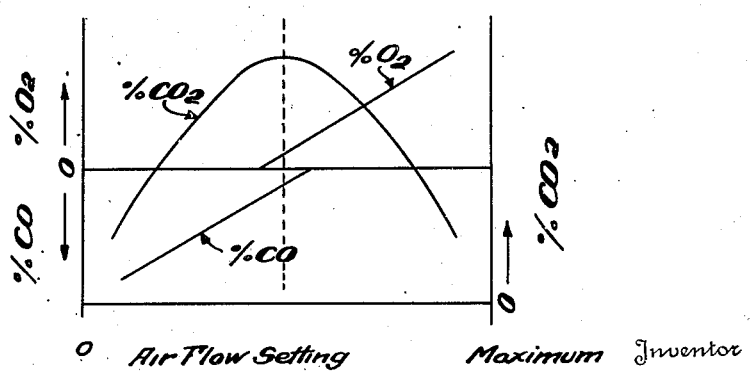
Inventor
WINFIELD B. HEINZ,
By Sidney A. Johnson
Attorney Inventor
WINFIELD B. HEINZ,
By Sidney A. Johnson
Attorney Patented Nov. 18, 1941

2,263,335

UNITED STATES PATENT OFFICE 2,263,335

GAS ANALYZER

Winfield B. Heinz, Bound Brook, N. J., assignor to American Cyanamid Company, New York, N. Y., a corporation of Maine Application November 10, 1939, Serial No. 303,888

9 Claims. (Cl. 73—51)

This invention relates to an apparatus for continuously analyzing gases, and has for its object to provide for the indication of the content of one or more constituents of a gas mixture.

The apparatus which forms the subject matter of my invention is not only adapted to give a continuous percentage indication of one or more of the constituents of a gas mixture, but also may be readily adapted for measuring the total amounts of the constituents being analyzed. My improved gas analyzer may also be readily adapted to operate suitable control apparatus in accordance with a desired content of the gas mixture being analyzed, as will be hereinafter more fully described.

I am aware of the fact that many other types of apparatus have been devised for the continuous analysis of a gas mixture, and such analyzers use as a basis of analysis schemes depending upon a change in thermal conductivity, a density change, a pressure drop across an orifice created by the absorption of one constituent of the gas and automatic measurement of the volume after one constituent has been absorbed. The mode of operation of such prior art commercial gas analyzers is described in "Chemical Engineer's Handbook," J. H. Perry, first edition, 1934, pages 1708–1710, published by McGraw Hill Book Company, New York, New York.

My invention relates to a continuous gas analyzer based upon the balanced bridge principle. More specifically, the gas being analyzed is caused to flow through my analyzer in two streams, in each of which are located a pair of orifices or capillaries for creating a suitable pressure drop. In one of these streams an absorber is placed for removing the constituent of the gas mixture which is to be analyzed. This absorber is located between the two orifices or capillaries as will be hereinafter more fully described in connection with the description of the specific embodiments of my invention. A suitable manometer is provided for indicating the pressure differential between the two streams of gas flowing through the analyzer.

The flow of gas through an orifice at pressure ratios below the critical value is $$i = K\frac{ap}{\sqrt{T}}$$

where $i$ is the amount of flow, $a$ is the area of the orifice, and $p$ and $T$ have their usual significance of pressure and temperature.

The manometer reading will indicate the difference in pressures of the two streams of gas at the points between the orifices, and expressed in the form of an equation, $$R = P_1 - P_2$$

But $P_1$ and $P_2$, the pressures in the two streams will equal the pressure applied across the analyzer less the pressure drop across the orifices and less the partial pressure of any gas removed by absorption, or $$R = (P - ki_1r_1) - (P - ki_2r_2 - Pa),$$

where $i_1$ and $i_2$ represent the flow of gas through the two branches of the instrument, $r_1$ and $r_2$ represent the resistance to flow offered by the two orifices, and $Pa$ represents the partial pressure of any absorbed gas. That the pressure drop across the orifice may be expressed by the equation $p = ki_1r_1$, is readily apparent from a consideration of the equation $$i = K\frac{ap}{\sqrt{T}}$$

Where the temperature is substantially constant, as is the case except where my analyzer is used as a calorimeter, $i$ will equal some new constant times a $p$. Likewise, the resistance to flow is inversely proportional to the area of the orifice, or $r = K_2/a$. Hence, substituting in the equation $$i = K\frac{ap}{\sqrt{T}}$$

$$i = KK_1\frac{K_2}{r}p$$

or $$p = kir, \text{ where } k = KK_1K_2$$

But the flow of gas through each branch of the analyzer will equal the pressure differential across the analyzer divided by the sum of the resistance offered by the two orifices in each branch or $$i_1 = \frac{kP}{r_1 + r_3}$$

and $$i_2 = \frac{kP}{r_2 + r_4}$$

where $r_2$ and $r_4$ represent the resistance to flow offered by the other orifice of each pair in the two branches, and $r_1$ and $r_3$ have the significance mentioned above.

Substituting in the equation $$R = (P - ki_1 r_1) - (P - ki_2 r_2 - Pa)$$

or $$-R = ki_1 r_1 - ki_2 r_2 - Pa$$

$$-R = kk\frac{Pr_1}{r_1 + r_3} - kk\frac{Pr_2}{r_2 + r_4} - Pa$$

But $Pa = kPVa$, where $Va$ is the volume percentage of the flow removed by the removal of the absorbed constituent. Hence, $$-R = kk\left(\frac{Pr_1}{r_1 + r_3} - \frac{Pr_2}{r_2 + r_4} - PVa\right)$$

or $$-R = kkP\left[\left(\frac{r_1}{r_1 + r_3} - \frac{r_2}{r_2 + r_4}\right) - Va\right]$$

But if the instrument has been brought into balance, so that when no gas is being absorbed a zero reading is obtained, $$\frac{r_1}{r_1 + r_3} = \frac{r_2}{r_2 + r_4}$$

and therefore $$R = kkPVa$$

Thus it may be seen that with my analyzer a reading is obtained which is equal to a constant times the pressure differential across the instrument times the volume percentage of the absorbed gas. The reading will be linear and the amount of the deflection may be increased or decreased at will by simply adjusting the pressure differential across the apparatus. Because of the linear scale accurate readings may be obtained, the instrument may be readily calibrated, and by passing a known gas mixture through the analyzer it may be easily adjusted to a precalibrated scale by suitably varying the pressure differential. In other words, since the reading of the manometer is directly proportional to the pressure applied across the analyzer times the percentage of the absorbed gas, by keeping the applied pressure constant, the reading will vary directly with the percentage volume change in the gas being analyzed. In order to calibrate a scale, it will only be necessary to pass one, or at the most two for checking purposes, known gas mixture through the analyzer to determine the displacement of the manometer from the zero point by a known percentage of gas. The other points may then be measured off directly. The simplicity of this method is readily apparent, and in commercial production of analyzers of this type a great portion of the expense of checking and calibrating each instrument is eliminated.

Also, since the reading is directly proportional to the pressure differential across the analyzer, for a constant gas mixture, by varying the pressure differential, the reading may be varied to conform to any precalibrated scale. Then, holding the pressure differential at this value, the analyzer may be used directly and accurately on unknown gas mixtures.

The invention may best more particularly be described in connection with the accompanying drawings, in which Fig. 1 is a schematic diagram of a simple single constituent analyzer, embodying the principles of the invention;

Fig. 4 shows diagrammatically a modification of my invention which will give an indication of a plurality of constituents of a gas mixture at the same time;

Fig. 5 is a diagrammatic showing of a modification of my invention adapted to record the amount of several constituents of a gas mixture and at the same time control a process in accordance with a desired difference between two constituents of the mixture;

Fig. 6 is a typical chart obtained by plotting the flue gas analysis against the rate of air flow through the blower into the combustion zone;

In the above drawings like parts in the various modifications have been designated by like reference characters.

Figure 1:
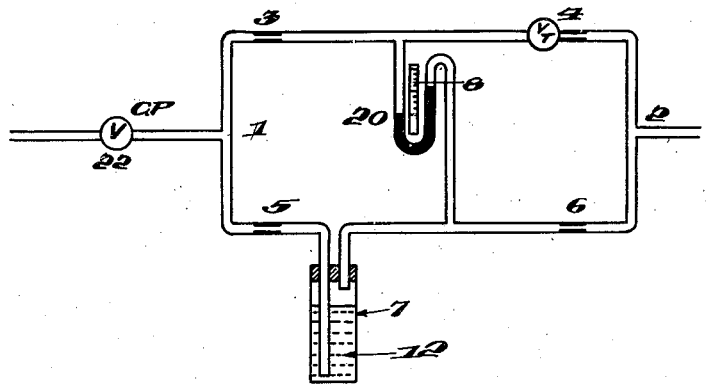

In the simplest form of my invention, shown in Fig. 1, the gas to be analyzed is first passed through a constant pressure valve 22, from which it passes to the T 1, where the gas flow is divided into two streams. In each stream the gas encounters a pair of capillaries shown at 3, 4, 5 and 6. An absorber 7, is placed in one of the streams between the pair of capillaries 5 and 6. This absorber is of the conventional type in which the gas is bubbled up through an absorbent 12, and the desired constituent removed therefrom. After the gas streams have passed through both sets of capillaries, the streams are united at a second T, 2, where the gas is exhausted to the atmosphere, which may be considered to be at substantially constant pressure. A manometer tube, 20, connects the two gas streams at points between the capillaries in each stream. The liquid in this manometer tube, 20, will be displaced an amount sufficient to balance the difference in the gas pressure in the two streams of gas flowing through the analyzer. A calibrated scale, 8, is provided for facilitating the reading of the amount of displacement necessary to balance the pressures. This scale is linear, as has been explained heretofore, and by suitably varying the pressure differential across the instrument, it may be calibrated to read the percentage of the absorbed constituent directly. Also, because of the fact that the amount of displacement necessary to balance the pressures in the two branches of the instrument is directly proportional to the pressure differential across the instrument, it is possible by varying this pressure differential to vary the amount of linear displacement for any specific pressure difference between the two streams. Thus, the ease and accuracy of the readings of the amount of displacement may be readily controlled. This factor is of great utility especially where small differences in pressure are to be measured.

The density of the liquid in the manometer tube will also determine the amount of linear displacement necessary to balance a given gas pressure differential. Knowing the approximate probable range of fluctuation in the constituent to be measured the density of the liquid in the manometer should be chosen as to give the most sensitive readings. Where the amount of the absorbed constituent is small, say less than 20%, a lighter liquid may be used than where it might go up to 80%. Hence, by the proper selection of the liquid in the manometer the ease of reading and the accuracy of the instrument may be increased.

Figure 2:
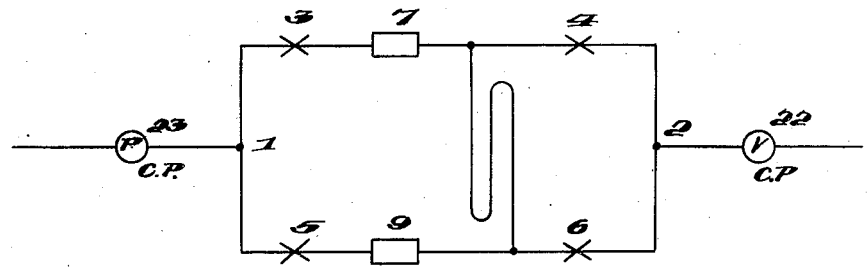
Fig. 2 is a schematic diagram of a modification of my invention adapted to show the difference of two constituents of a gas mixture.

The modification of my invention shown in Fig. 2 is substantially the same as that shown in Fig. 1 except that there is a gas absorber in each line between the capillaries. These absorbers, 7 and 9, are filled with liquids absorbing different gases of the gas mixture being analyzed. The manometer 20, will record, not the amount of any one constituent, but the difference between the two absorbed constituents. In Fig. 2, the analyzer is shown as being provided with a constant pressure pump, 23, to supply gas at a constant pressure and a constant pressure valve, 22, on the discharge side.

Figure 3:
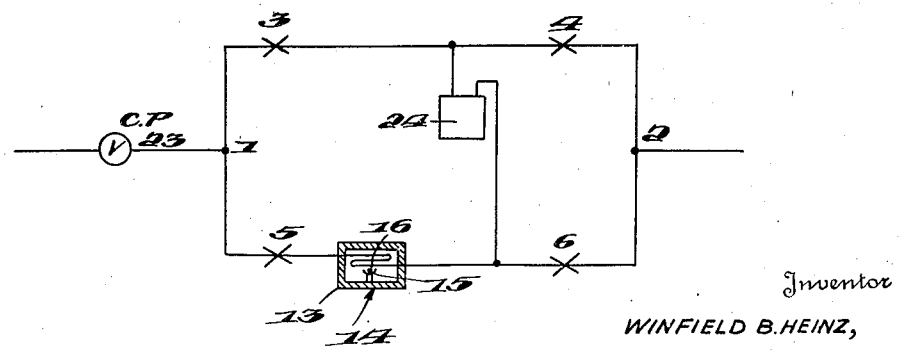
Fig. 3 is a schematic diagram of a modification of my invention in which the analyzer serves as a calorimeter, the heat of combustion to be measured serving to change the volume of the gas passing through the analyzer.

In Fig. 3 I have shown how the basic principles of my invention may be incorporated into a calorimeter. A calorimeter combustion chamber, 13, is substituted for the absorber, 7, of Fig. 1 between the orifices 5 and 6. This chamber is provided with suitable insulation, 14, to substantially prevent heat losses from the calorimeter. The calorimeter chamber is also provided with a suitably supported combustion vessel, 15, into which a weighed amount of the material, 16, whose heat of combustion is to be measured, is placed. The chamber is provided with any suitable means as an electric resistance wire for the ignition of the charge, 16, as is conventional in the art and not shown in the diagrammatic drawing in Fig. 3. The heat of combustion is substantially all transferred to the gas flowing from orifice 5 to orifice 6. This increase in temperature produces a corresponding increase in pressure resulting in a deflection of the recording manometer, 24. Since the pressure differential across the gas analyzer is maintained constant, the rate of gas flow through the two branches of the analyzer will be substantially constant. Therefore, the heat of combustion transferred to the gas flowing between orifices 5 and 6 will be a direct indication of the heat of combustion per unit of time and by recording the manometer deflection over the combustion period a direct indication of the total heat of combustion of the sample may be obtained. In other words, the integral $$\int_{t_1}^{t_2} h\, dt$$

where $h$ equals the deflection of the manometer and $t_1$ is the time of initial deflection and $t_2$ is the time the manometer returns to zero deflection, will give the total heat released. By the use of a continuously recording manometer a chart will be obtained from which the heat of combustion may be readily ascertained since it will be directly proportional to the area between the zero reference line on the chart and the curve traced by the deflection of the manometer indicator.

A modification, such as is shown diagrammatically in Fig. 4, is used to measure two constituents of a gas mixture simultaneously. In this modification the gas flowing through the analyzer is divided into three streams. Each of these streams is provided with a pair of orifices as shown at 3, 4, 5, 6, 10 and 11. Two of these gas streams are provided with absorbers, as shown at 7 and 9, each of which absorbs one of the gas constituents to be measured. Each of these gas streams is then connected to the stream having no absorber by a suitable manometer, as shown at 20 and 21. The manometer tubes, as before, are connected at a point between the pairs of orifices. The manometer, 20, will indicate the amount of the constituent being removed by absorber, 7, and manometer, 21, will give a continuous indication of the gas being removed by the absorber 9.

The modification shown diagrammatically in Fig. 5 is an example of how my improved gas analyzer will function as a control instrument for a furnace. The controller as shown in this modification is actuated by the pressure differential between two constituents of the flue gas mixture from the furnace passing through the analyzer, or in other words, the pressure difference between these two constituents. Essentially the analyzer is the same as that shown in Fig. 4 except that an additional manometer, 17, which is of the diaphragm type, is connected on one side to the stream of gas from which one constituent is removed by absorber 7, and on the other side to the stream from which another constituent is removed by absorber 9. Differences in pressure between these two gas streams will cause the central diaphragm of the manometer, 17, to move. To this diaphragm a mercury switch, 18, is pivotally connected in such a manner that the motion of the diaphragm will cause the switch to open and close. The opening and closing of this switch will actuate the relay, 19, which will in turn open and close a circuit to adjust the rate of air flow through the furnace fuel bed.

The absorber, 7, of the analyzer is filled with a material which will remove CO from the flue gases flowing from orifice 3 to orifice 4. The absorber, 9, is filled with material which will remove oxygen from the flue gases flowing from orifice 10 to orifice 11. Therefore the total pressure of the flue gases minus the partial pressure of oxygen will act upon one side of the manometer, 17, and the pressure of the flue gases minus the partial pressure of CO will act upon the other side of the diaphragm. The mercury switch 18 is so pivoted that when the difference between oxygen and the carbon monoxide content of the flue gases reaches a desired value, the motor driven blower is set at a speed which tends to maintain these conditions. Should the amount of carbon monoxide increase and the oxygen content decrease the difference in pressure in the two lines of the manometer 17 would tilt the switch 18 in the proper direction to close it and the relay 19 which will act to speed up the motor increasing the supply of oxygen available for combustion in the furnace. The manner in which the difference between oxygen and carbon monoxide contents may be used to serve as the basis for controlling a furnace draft is described best in connection with the following discussion of Fig. 6.

The graph in Fig. 6 represents the graph normally obtained when the oxygen, carbon monoxide and carbon dioxide content of the furnace flue gases are plotted against the air flow to the combustion zone. Maximum efficiency is obtained at a definite ratio of oxygen to carbon monoxide in the flue gases. When the air flow is less than this optimum ratio an increasing amount of the coal is incompletely burned to carbon monoxide. On the other hand, when the air flow is above this optimum value all the coal is burned to carbon dioxide but a large amount of heat is dissipated in heating the unnecessary air passing through the combustion zone and lost in the flue gases. In the theoretical furnace the maximum combustion efficiency would be obtained where the flue gases contain neither carbon monoxide nor oxygen, but since this result cannot be obtained in actual practice, a definite ratio of oxygen content to carbon monoxide content of the flue gases will give the best results. As is readily apparent from Fig. 6, the most efficient combustion is obtained at a point where there is little, if any, difference between the oxygen and the carbon monoxide contents of the gas. As soon as one constituent is present in any appreciable excess of the content of the other it is an indication that there is either an excess of oxygen available for combustion or a lack of oxygen.

Figure 7:
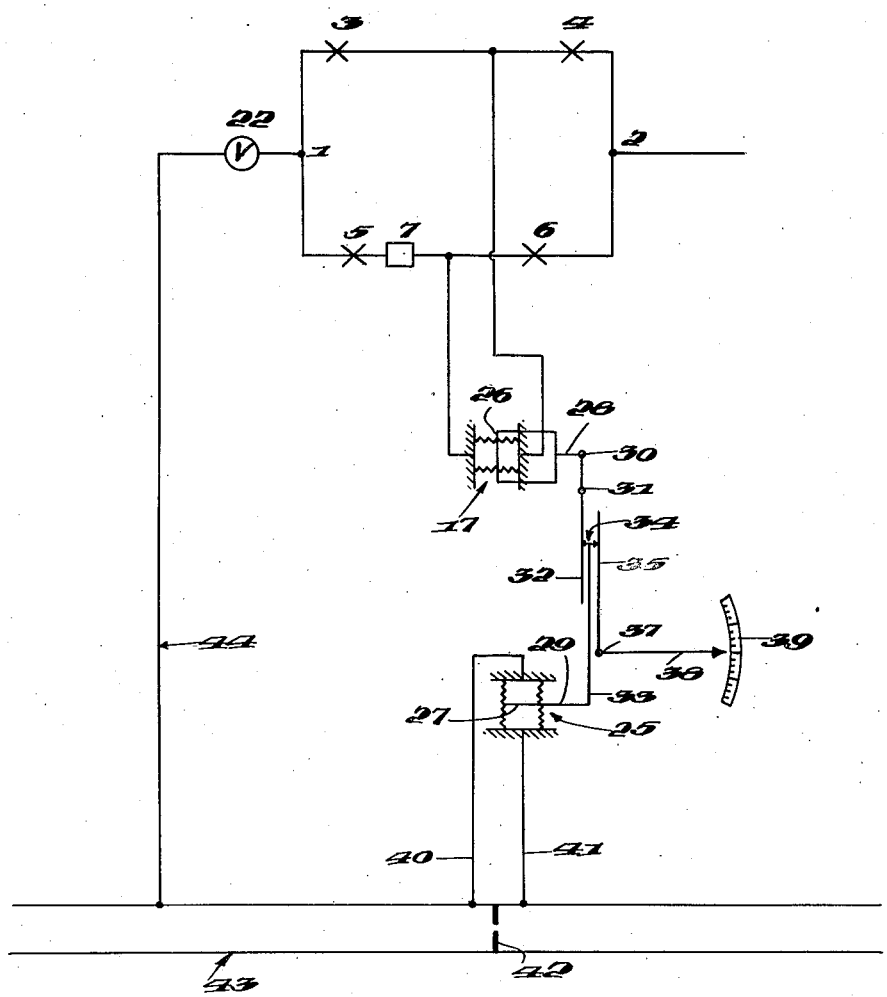
Fig. 7 is a schematic diagram showing a modification of my invention adapted to measure the total flow a particular constituent of a gas mixture.

The modification of my invention in Fig. 7 shows how it may be used to measure the total amount of a desired constituent of a gas mixture flowing through a pipe line. The analyzer is connected to the pipe line, 43, through which the gas mixture is flowing by the tube, 44. The pressure of the gas across the analyzer is regulated in the same manner as in the modification shown in Fig. 1 by means of the constant pressure valve, 22. The manometer, 20, of Fig. 1 is replaced, however, by a diaphragm type manometer, 17, the gas pressure in each leg of the analyzer acting upon opposite sides of the central diaphragm, 26, producing displacement thereof in accordance with differences in the gas pressure in the two legs of the manometer. This central diaphragm, 26, is connected through the linkage, 28, to the end, 30, of a lever, 32, which has its fixed pivot at 31. Displacement of the end, 30, of this lever will produce a corresponding displacement of the other end of the lever, 32. As is readily apparent, the displacement of the lever, 32, will be directly proportional to the differences in pressure in the two legs of the manometer and hence directly proportional to the percentage of the constituent being analyzed which is removed by the absorber, 7.

In order to measure the total flow of the gas through the pipe, 43, an orifice, 42, is placed in the pipe. As is well known there will be a pressure drop across this orifice, 42, and this pressure drop will vary in proportion to the total amount of gas flowing therethrough. In order to measure this pressure drop the diaphragm manometer, 25, is connected through tubes, 40 and 41, to the pipe, 43, on opposite sides of the orifice, 42. Variations in the pressure on the two sides of the orifice will produce a corresponding displacement of the central diaphragm, 27, of the manometer, 25. This displacement will be transmitted through the link, 29, to the rod, 33. A cross head, 34, the ends of which are provided with suitable pivots, is located at the end of rod, 33, remote from the link, 29. The displacement of the rod, 33, and the cross head, 34, thereon will be proportional to the total flow of gas through the pipe, 43. One pivoted end of cross head, 34, rests upon the lever 32, which, by its motion, indicates the percentage of the constituent being removed by the absorber, 7, in the analyzer. In order to correlate the displacements given to the lever, 32, and the rod, 33, a lever, 35, is mounted so that one free end is in contact with the opposite pivoted end of the cross head, 34, from that contacted by lever, 32. The lever, 35, is fixed at pivot, 37. The amount of the angular displacement of the lever, 32, and the amount of linear displacement of the rod, 33, both cooperate to vary the amount of angular displacement of the lever, 35. In order to measure the angular displacement of the lever, 35, a pointer, 36, is arranged to rotate with it about the fixed pivot, 37. A suitably calibrated scale, 39, is provided to indicate the displacement of the lever, 35, as indicated by the pointer, 36. Suitable means (not shown) are provided to urge the cross head, 34, into contact with the lever, 32, and to urge the free end of the lever, 35, into contact with the cross head, 34.

By a suitable arrangement of the levers, 32 and 35, and the rod, 33, and the cross head, 34, thereon, the displacement of the lever, 35, will be proportional to the products of the displacement of the lever, 32, and the rod, 33. The displacement of the lever, 35, will therefore be proportional to the percentage of the constituent removed by the absorber times the total rate of flow of the gas through the pipe line, 43. The scale, 39, when suitably calibrated will, therefore, indicate the total rate of flow of the constituent flowing through the pipe line at any given time. A recording chart may be substituted for scale, 39, and the amount of the constituent flowing through the pipe line recorded for any desired length of time. Also by the use of any one of several well known integrating mechanisms operating in conjunction with the indicator or recorder, the total quantity of the analyzed constituent which has passed the metering point can be measured.

Many modifications of my invention in addition to those shown in the drawings will be readily apparent to those skilled in the art, and the specific modifications shown are for illustrative purpose only, and not to be considered as limiting my invention.

In the operation of my gas analyzer the selection of either a constant pressure pump or constant pressure valve on the intake side of the analyzer, and the choice of either a constant pressure valve or discharge into the atmosphere is a matter of judgment depending upon the particular conditions under which the analyzer is to be used. If the gas being supplied to the analyzer is at a high initial pressure, a constant pressure valve may be used on the supply side, whereas if the gas to be measured is at a low pressure a constant pressure pump is preferable. In order to secure accurate readings the pressure drop across the orifices or capillaries should be fairly high, especially in relation to the pressure drop in the constant pressure valve or pump. If the pressure drop in the constant pressure valves were of the order of the pressure drop in the orifices, any slight pulsations in the valve would register on the manometer and the accuracy of the gas analyzer would be reduced.

In the operation of the gas analyzer, the first step is to adjust the analyzer so that there will be zero deflection when no gas is being absorbed by the absorber. Means, such as the throttling valve $V_t$ shown diagrammatically in conjunction with capillary, 4, in Fig. 1, are provided for adjusting one of the capillaries or orifices to secure this result. Similar means for balancing the analyzers shown in Figs. 2, 3, 4, 5 and 7 are utilized where capillaries 4 and 11 may be provided with means such as a throttling valve. Having balanced the analyzer, it may then be directly used to analyze the gas mixture.

The advantages of my improved gas analyzer lie in its simplicity, freedom from moving parts, low cost, and continuous indication of the gas being analyzed. Any type of manometer of the indicating or recording type may be used depending upon the particular conditions. And the manometer may be operatively connected to any desired control apparatus. Another important advantage is that by the use of the Wheatstone bridge principle, small differences may be measured with a high degree of precision. The analyzer may be used with any mixture of gases of which one can be absorbed in some suitable cell, without regard to the relative densities or thermal conductivities of the constituents. The sensitivity of the instrument can be made great or small simply by adjusting the total pressure which is applied across the bridge in accordance with the requirements of each particular gas mixture being analyzed. Calibration is readily performed simply by adjusting the applied pressure.

Obviously my gas analyzer is suitable for use for many other commercial operations than those mentioned above. For example, it may be used as a humidity indicator, and in this use when equipped with the proper controls, may be used to control the operation of air conditioning apparatus.

Another commercial field in which my analyzer may be used when equipped with either indicating or recording manometers is in the adjustment of internal combustion engines in accordance with an analysis of their exhaust gases. The more general use of this type of adjustment by servicing garages only awaits the introduction of a sturdy, accurate analyzer at a lowered cost.

The foregoing illustrations of the operation and utility of my invention are given by way of example only and are not to be considered as limiting it within the scope of the appended claims.

I claim:

1. An apparatus for indicating a pressure change in a gas passing therethrough comprising in combination means for causing the gas to flow in at least two streams, means for restricting the flow of gas at two points in each of said gas streams, means in one of said streams between the restrictions for producing a pressure change in the gas passing therethrough, means for indicating any difference in pressure between said one stream and another of said streams between the respective restrictions therein, and pressure regulating means to keep the pressure differential across the apparatus substantially constant.

2. An apparatus for analyzing gases comprising in combination means for causing the gas to flow in at least two streams, means for restricting the flow of gas at two points in each of said gas streams, means in one of said streams between the restrictions therein for absorbing a gas constituent to be analyzed, means for indicating any difference in pressure between said one stream and another of the streams between the respective restrictions therein, and pressure regulating means to keep the pressure differential across the apparatus substantially constant.

3. An apparatus for continuously analyzing gases comprising in combination means for causing the gas to flow in two streams, means for restricting the flow of gas at two points in each gas stream, means for absorbing a desired unknown constituent from the gas to be analyzed from one of said gas streams between said restrictions, means for continuously indicating any difference in pressure between said streams at points between said restrictions in each stream, and means to keep the pressure differential across the apparatus substantially constant.

4. An apparatus for continuously indicating the amount of heat imparted to a gas by combustion in a calorimeter comprising in combination means for causing the gas to flow in two streams, means for restricting the flow of gas at two points in each stream, a combustion chamber between the restrictions in one of said streams through which said gas passes, means for continuously indicating any difference in pressure between said streams at points between said restrictions in each stream, and means to keep the pressure differential across the apparatus substantially constant.

5. The apparatus of claim 1 in which means are provided for varying the pressure drop across one of the restricting means in at least one of said gas streams to which the pressure difference indicating means is connected whereby a zero pressure differential may be obtained when there is no pressure change in the gas passing through the streams connected to the pressure difference indicating means between the respective restrictions therein.

6. The apparatus of claim 3 in which means is provided for varying the pressure drop across one of the restricting means in one of said gas streams whereby a zero pressure differential may be obtained between the two streams when there is no pressure change in the gas passing through the absorbing means.

7. The apparatus of claim 4 in which means is provided for varying the pressure drop across one of the restricting means in one of said gas streams whereby a zero pressure differential may be obtained between the two streams when there is no pressure change in the gas passing through the combustion chamber.

8. An apparatus for operating control equipment in accordance with variations in the analysis of a gas mixture passing therethrough comprising in combination means for causing the gas to flow in at least two streams, means for restricting the flow of gas at two points in each stream, means in all but one of said streams for absorbing a gas constituent, said absorbing means in said gas streams being placed intermediate the restrictions, and means responsive to any difference in pressure between at least one pair of said streams at points between the restrictions to operate suitable control equipment, and means to keep the pressure differential across each of said streams substantially constant.

9. An apparatus for continuously analyzing the total rate of flow of a desired constituent in a gas flow comprising in combination means for withdrawing a minor portion of the total gas flow, means for causing this gas flow to divide into two streams, means for maintaining the pressure difference across each of said streams substantially constant, means for restricting the flow of gas at two points in each stream, means for absorbing the constituent of the gas mixture being analyzed from one of said streams, means connected to said two streams responsive to any pressure differentials occurring therein between the pairs of restrictions, means responsive to the total gas flow, and means responsive to the product of said last two mentioned means.

WINFIELD B. HEINZ.